Nov. 4, 1941.   F. W. COTTERMAN   2,261,106
AUTOMATIC CLUTCH AND FOUR SPEED TRANSMISSION
Filed June 30, 1939   4 Sheets-Sheet 1
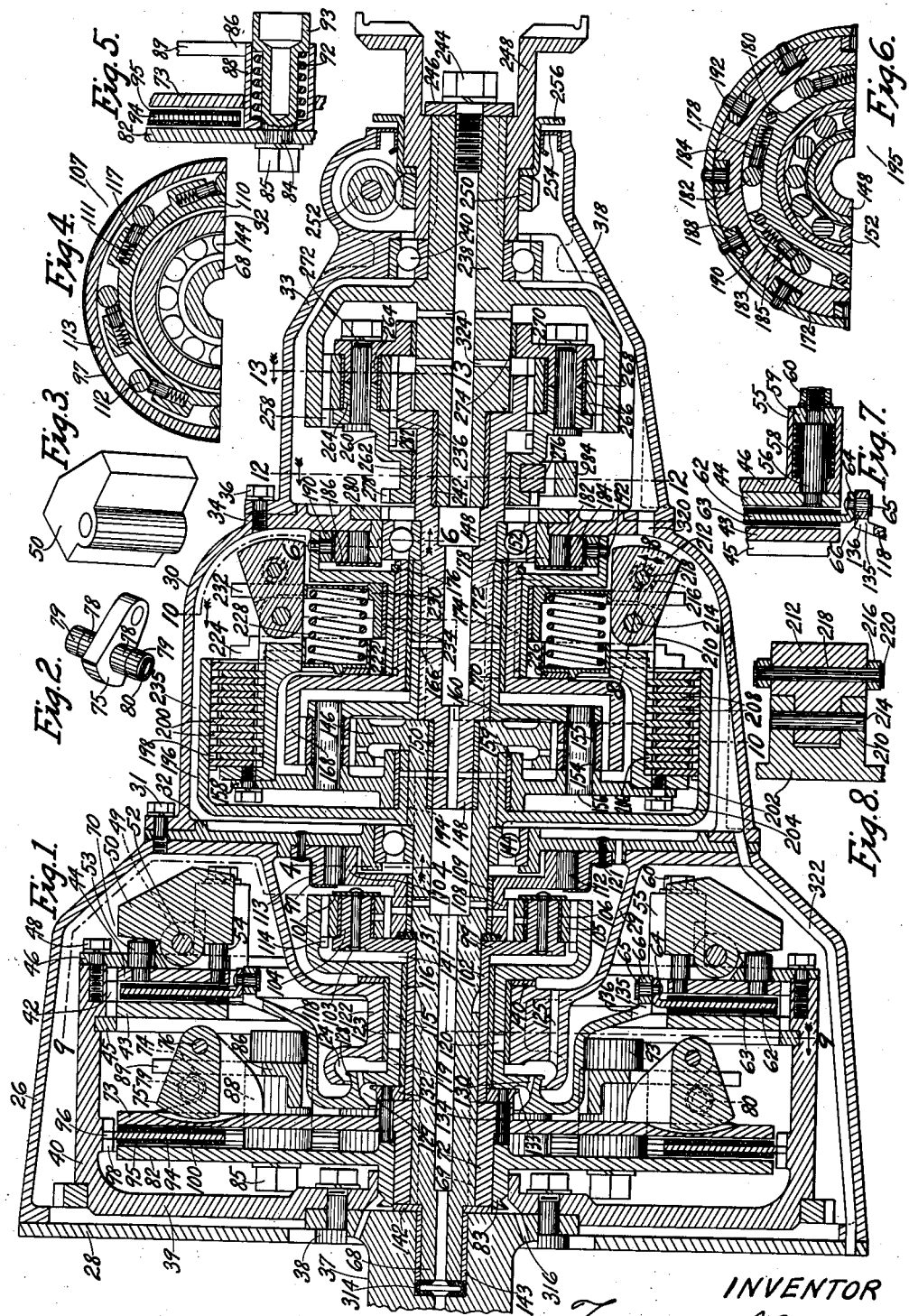
INVENTOR
Frederick W. Cotterman Nov. 4, 1941.     F. W. COTTERMAN     2,261,106
AUTOMATIC CLUTCH AND FOUR SPEED TRANSMISSION
Filed June 30, 1939     4 Sheets-Sheet 2
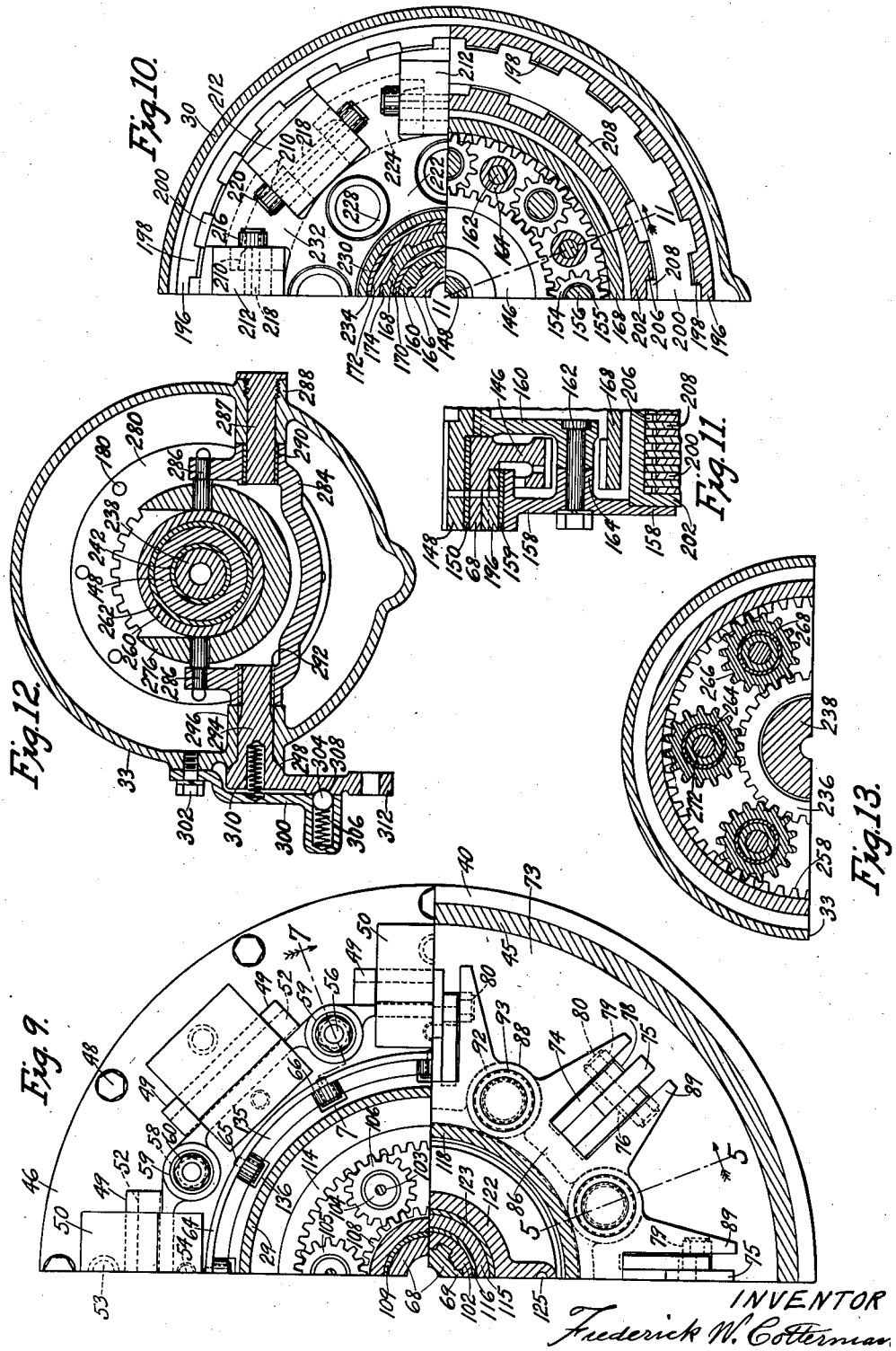
INVENTOR
Frederick W. Cotterman

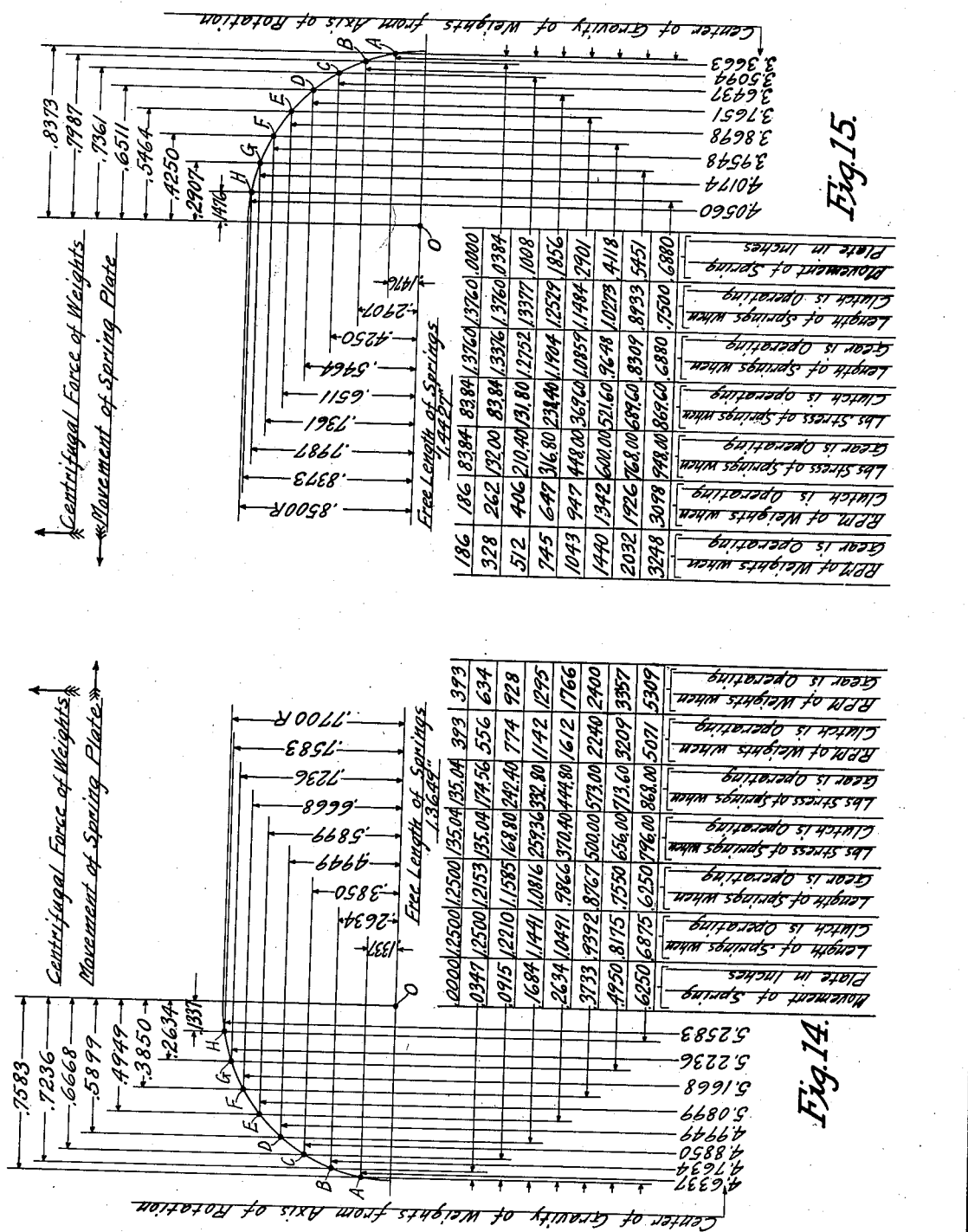

Figures 16, 17, 18, 19:
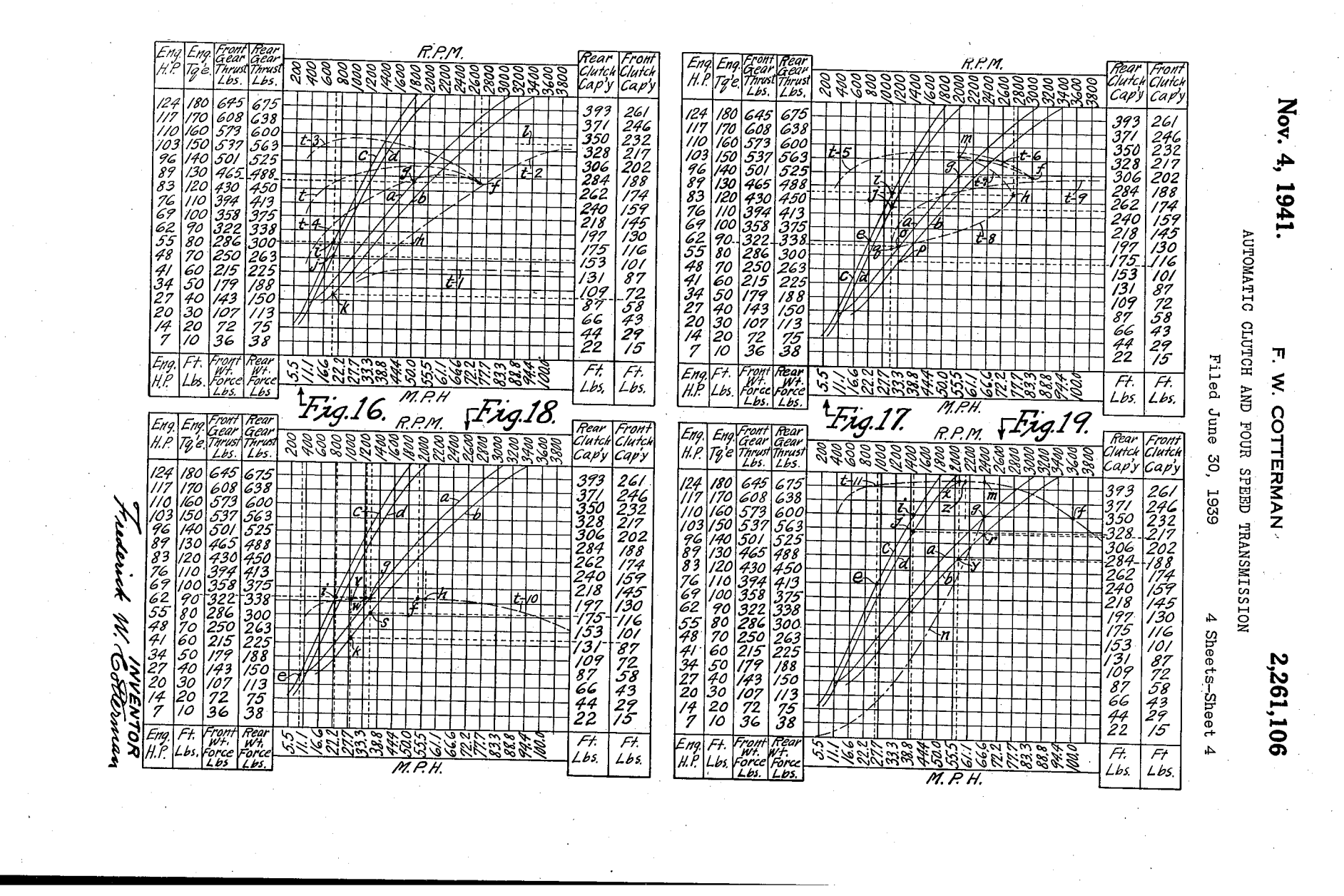

Nov. 4, 1941.    F. W. COTTERMAN    2,261,106
AUTOMATIC CLUTCH AND FOUR SPEED TRANSMISSION
Filed June 30, 1939    4 Sheets-Sheet 4

Frederick W. Cotterman  INVENTOR

Patented Nov. 4, 1941

2,261,106

UNITED STATES PATENT OFFICE 2,261,106

AUTOMATIC CLUTCH AND FOUR SPEED TRANSMISSION

Frederick W. Cotterman, Dayton, Ohio, assignor of one-half to Bessie D. Apple, Dayton, Ohio Application June 30, 1939, Serial No. 282,240

20 Claims. (Cl. 74—260)

This invention relates to automatic clutch and transmission mechanism, and is particularly applicable to motor vehicles, part of the mechanism being similar to that in my copending application Serial No. 257,052 filed February 18, 1939.

An object of the invention is to discard the present four ratio automotive clutch and transmission mechanism which now comprises a foot operated clutch, a hand shiftable transmission and an automatic overdrive, and replace it with a simple four speed device wherein the clutch operation and all changing of ratio is completely automatic and will function in a normal manner and without being given any attention by the operator.

When automatic overdrives first came into use it was the practice to so construct them that they would become operative only at a vehicle speed exceeding fifty miles per hour, the intention being that since most driving was done in third speed or high, that is, through none of the transmission gearing, the exceptional driver who required exceedingly high speed would be satisfied to have the fourth speed through gears.

Lately, however, the tendency has been to constantly lower the speed at which the automatic overdrive comes into play, the present practice being to make it available at about thirty five miles per hour, the result being that, with so low a cut-in speed for the overdrive, the larger portion of all miles driven, even within city limits, is done through the fourth speed, i. e., overdrive, and therefore through gearing.

Since it is obviously desirable, to have that speed ratio, through which most miles are driven, operate without transmitting the power through gearing, it is an object of this invention to provide an automatic four speed transmission mechanism in which there are three geared ratios, low, second, and third, the four speed being high, or direct drive.

Another object is to so construct and arrange the transmission gearing and clutch mechanism that if the mechanism is operating in a given speed ratio and there arises a need for more power than the engine can deliver at its then existing speed, a reduction of one, two, or even three steps in the ratio will at once automatically take place to allow the engine to rise to the most appropriate speed, and if the load conditions thereafter change so as to require less power than the engine can efficiently deliver at its then existing speed, a rise of one or more steps in the ratio will automatically take place, to lower the engine speed to the most desirable point.

Another object is to so construct and arrange the ratio changing mechanism, that, although acceleration from a low to a higher speed may proceed by transmitting power progressively through all four of the speed ratios, when an operator desires to change to high gear at a relatively low vehicle speed, only such of the ratios need be called into action as will provide the desired vehicle speed without exceeding the efficient speed range of the engine.

It is not new to connect two speed-torque controlled gear sets in series, an example being disclosed in my patent No. 1,978,834 of October 30, 1934. Such a device, however, normally has both sets connected in series for low gear, a clutch to eliminate the first gear set while the other is retained for second gear, and another clutch to eliminate the second gear set also for high gear, thus providing three ratios only, i. e., low, second, and high, by connecting two gear sets in series.

In the present invention, however, it is an object to provide a four speed transmission by arranging two speed reducing gear sets in series, with the second set having considerably greater speed reducing capacity than the first, and with means to transmit the power through both gear sets in series for low speed ratio, through the second set only for a second speed ratio, through the first set only for a third speed ratio, and through neither set for high speed ratio.

Another object is to so arrange two gear sets with the driven member of the first acting as the driving member of the second, the sets each comprising ring and sun gears with planet pinions and carrier, the first set having the ring gear on the driving member and the second set the sun gear on the driving member, the carrier being on the driven member in both sets, whereby the second set is necessarily of greater speed reducing capacity than the first.

Another object is to provide the first and second transmission gear sets each with a centrifugally engageable clutch for connecting their driving and driven members directly and independently of the gearing, the clutch of the second set being of much greater carrying capacity than the clutch of the first set, to the end that when both clutches are engaged for high gear ratio and load conditions arise making it desirable to increase the power applied to the wheels, the first clutch will release to make the first gear effective for third gear ratio before the second clutch releases to make the second gear effective for second gear ratio.

Another object is to provide both the first and second transmission gear sets with helical gear teeth so angled that the tangential load carried by the gearing causes an end thrust in a direction suitable for holding their respectve clutches in their normal fully disengaged position as long as the gears are operative, the helix angles and the centrifugal clutch weights being so arranged and proportioned that, under normal acceleration against a uniform load, the first clutch will engage for second ratio, then the second clutch will engage and cause disengagement of the first for third ratio, then the first will re-engage for high ratio, and when any clutch is disengaged by the gear load, it is so fully disengaged that no dragging action will be had by partial or insufficient engagement.

Another object is to provide a main centrifugal clutch, responsive to the speed of the engine, to connect the engine to the driven member of the first gear set through its gearing, and a second centrifugal clutch responsive to the speed of the vehicle to connect the engine to the driven member of the first gear set independently of its gearing, whereby, if the vehicle is coasting while the engine is dead or is idling, the engine will be connected for engine braking at a low vehicle speed through said second centrifugal clutch.

Another object is to so construct and arrange the two engine clutches, one of which connects the engine to the vehicle through the gearing of the first gear set, and the other through the said gear set independently of its gears, that the engine clutches will be contained in an entirely separate housing from the gears, whereby the gears may be fully lubricated, and the engine clutches may be kept dry, to the end that dry plate clutches may be employed.

Another object is to provide, in the centrifugally operated clutches, means for causing the centrifugal weights of a set to all move in unison, to the end that no one weight of a set may move outwardly ahead of the others and thereby cause an unbalanced effect.

Another object is to provide the several helical gears which move axially under load to hold their respective clutches disengaged, with anti-friction means to permit their axial movement without undue resistance from friction, to the end that the axial pressure of the gears, which will vary with the load carried thereon may not be delayed in effecting engagement of the clutches which eliminate the drive through the gearing.

Another object is to so construct the several centrifugal clutches that they are normally disengaged, the speed responsive clutch engaging means of the main engine clutch being engine driven and the speed responsive means of the first and second transmission clutches being vehicle driven, whereby starting the vehicle from rest will always be done through the gearing, although the length of time the gearing will remain operative will depend on the balance between the end thrust of the gearing due to load and the vehicle driven speed responsive means of the transmission clutches.

Another object is to provide, for each of the clutches which engage to eliminate the transmission gearing, a resilient means which is normally inoperative to engage the clutch, and centrifugal weight means rotated in proportion to vehicle speed and normally adapted, at a low vehicle speed, to first apply said resilient means to urge engagement of the clutch, then further stress the resilient means to more forcibly urge clutch engagement as the vehicle speed increases, whereby starting of the vehicle will always be done through the gearing yet the vehicle speed at which it is eliminated will depend on the load being transmitted through the gears.

Another object is to so construct the resilient clutch engaging means and the centrifugal weight means of the transmission clutches that the force of the weights will be applied to stress the resilient means through a leverage which becomes progressively less effective as the speed increases, whereby the stress of the resilient clutch engaging means will increase at a rate which is slightly less than in direct proportion to the R. P. M. instead of at a rate proportional to the square of the R. P. M. as is the case where the force of centrifugal weights is applied directly or through an unvarying leverage as in common practice, to the end that sufficient clutch engaging pressure may be had at the lower speeds without having too great a clutch engaging pressure at the higher speeds.

Another object is to so construct and arrange the clutch mechanism of the several transmission gear sets, that direct drive will always be fully accomplished before gear drive is eliminated, the clutches, by engagement, lifting the load off the gears, to the end that there will be no period between clutch drive and gear drive when there is disconnection between the engine and the vehicle wheels as there is in conventional transmission mechanism, whereby there can be no free wheeling either before, after, or during a change in ratio.

Another object is to provide a simple and effective reversing gear set separate from the transmission gear sets, with a manually operable lever to shift from a forward to a neutral position only when starting or limbering up the engine, and to reverse position only when backing the vehicle, the lever being kept in the forward position at all other times and under all other driving conditions.

These and other objects are attained in the structure hereinafter described and illustrated in the drawings, wherein, Fig. 1 is a longitudinal, vertical, axial section through the complete mechanism.

Fig. 2 is a detail perspective view of one of the centrifugal weights provided for operating the first transmission clutch.

Fig. 3 is a detail perspective view of one of the centrifugal weights provided for operating the main engine clutch.

Fig. 4 is a half transverse section through a part of the first or front gear set, taken at 4—4 of Fig. 1, and showing the roller brake for holding the sun gear of the front gear set against backward rotation.

Fig. 5 is a fragmentary section, taken at 5—5 of Fig. 9 through one of the springs which are variably energized to urge engagement of the first or front transmission clutch.

Fig. 6 is a half transverse section through a part of the second or rear gear set, taken at 6—6 of Fig. 1, and showing the roller brake for holding the ring gear of the rear gear set against backward rotation.

Fig. 7 is a fragmentary section, taken at 7—7 of Fig. 9, through one of the springs which must be overcome by the centrifugal weights of the main engine clutch before it may be engaged.

Fig. 8 is a fragmentary section, taken at 8—8 of Fig. 1, through one of the centrifugal weights provided for operating the rear transmission clutch.

Fig. 9 is a transverse half section, taken to 9—9 of Fig. 1, the upper portion showing part of the main engine clutch and the front transmission gearing, and the lower portion showing part of the front transmission clutch.

Fig. 10 is a transverse half section, taken at 10—10 of Fig. 1, the upper portion showing the centrifugal weight mechanism of the rear transmission clutch, and the lower portion showing the rear transmission gearing and clutch.

Fig. 11 is a fragmentary section taken at 11—11 of Fig. 10 showing the planet pinion carrier structure of the rear transmission gear set.

Fig. 12 is a transverse section, taken at 12—12 of Fig. 1 through the manually operable portion of the reversing gear set.

Fig. 13 is a transverse half section through the reversing gears.

Fig. 14 is a diagram showing the action of the centrifugal weights of the front transmission clutch as the weights swing outwardly about their hinge pins to different angular positions, the diagram giving the amount of shortening of the clutch engaging springs per unit of angular movement of the weights, the stress due to said shortening, and the R. P. M. required of the weights to produce the given clutch engaging stresses through the leverages available at the several angular positions.

Fig. 15 is a diagram similar to Fig. 14 but giving the same data relative to the rear transmission clutch and weights.

Fig. 16 is a curve chart plotted from Figs. 14 and 15, and shows a driving condition where the mechanism will shift from low to high ratios without going through the second and third ratios, what amount of power may thereafter be applied without enforcing a shift down to third speed, and what amount of power could be applied without shifting down to second speed.

Fig. 17 is a curve chart plotted from Figs. 14 and 15, and shows a driving condition where the mechanism will shift from low to second to high without going through the third ratio, and the power applicable after the shift which will not cause a shift back down.

Fig. 18 is a curve chart plotted from Figs. 14 and 15, and shows how, with comparatively low engine power steadily applied, a shift may be made through all four ratios.

Fig. 19 is a curve chart plotted from Figs. 14 and 15, and shows what occurs when starting a vehicle from a dead stop and keeping the maximum engine torque applied without interruption or change as the vehicle speed rises to its maximum.

Construction

The clutch housing 26 may be secured to the engine 28 in the usual manner. The housing 29 for the front transmission gearing is formed integral with the clutch housing 26 by depressing the rear wall thereof. The housing 30 for the rear transmission gear is secured to the clutch housing 26 by the screws 31. A partition plate 32 is interposed between the open ends of the housings 29 and 30. The housing 33 for the reverse gear is secured to the rear wall 34 of the housing 30 by the screws 36.

Secured to the crank shaft 37 by bolts 38 is the flywheel 39, the rim 40 of which has internal splines 42 to which the external splines of the main clutch backing plate 43 and pressure plate 44 are slidably fitted. A spring ring 45 in a groove in the rim 40 limits forward movement of the backing plate 43.

The main clutch frame 46 is secured to the flywheel rim 40 by screws 48 and carries a series of hinge ears 49 (see Fig. 9) to which the main clutch weights 50 (see Fig. 3) are swingably held by hinge pins 52. Pressure plate 44 has a series of pins 53 which extend through holes in the frame 46, the ends of the pins touching the upper front face of the weights.

A second series of pins 54 carried by the pressure plate 44 have their rear ends bearing against the lower front face of the weights. Midway between adjacent weights 50 are a series of hubs 55 (see Fig. 7). Pressure plate 44 has a series of studs 56 extending through the frame 46 and fitting it closely but slidably.

The hubs 55 are counterbored to receive springs 58. Collars 59 held on the free ends of the studs 56 by nuts 60 fit the counterbored part of the hub closely but slidably and hold the springs 58 under an initial tension. The close fitting studs 56 and collars 59 serve as guides to restrain one side of the pressure plate 44 moving ahead of the other and consequently cause the weights 50 to move out in unison.

The clutch plate 62 is faced with a commercial dry plate facing 63. The inner diameter of the plate is flanged at 64 and carries the studs 65 and rollers 66 through which the plate transmits its power when clamped between the backing plate 43 and pressure plate 44. The main clutch may be broadly designated by the numeral 70.

The shaft 68 has external splines 69 over which the internally splined hub 72 of the front clutch frame 73 is fitted. The clutch frame 73 is provided with pairs of hinge ears 74 between which the weights 75 of the front clutch (see Fig. 2) are swingably supported by the hinge pins 76. Each weight has a pair of hubs 78, on a reduced outer end of each of which a roller 79 is rotatable. The rollers are held in place by washers 80 which are held on the reduced end by riveting. The ears 74 are so shaped on their outer edges as to provide a stop for the hubs 78 to limit inward swinging of the weights.

The front clutch pressure plate 82 has a hub 83 slidable axially over the hub 72 of the clutch frame. A series of guide studs 84 (see Fig. 5) are held angularly spaced in the pressure plate 82 by the nuts 85. The studs 84 are hollowed for lightness only.

A spring compressing plate 86 has a series of hubs 88 extending forwardly intermediate the ears 74, and a series of arms 89 extending outwardly from the hubs, each arm 89 lying immediately in back of and in contact with a roller 79.

The hubs 88 are bored at their outer ends to fit over the guide studs 84 closely but slidably, then counterbored to receive the springs 92, the enlarged outer ends 93 of the studs 84 being slidably fitted to the counterbores. The clutch plate 94 is faced with linings 95 similar to the main clutch plate 62 and has external teeth 96 which fit slidably into the internal splines 98 of the flywheel rim 40. The front clutch may be broadly designated by the numeral 100.

The front gear set which is contained in the housing 29 and enclosed therein by the partition 32, comprises a planet pinion carrier 99, the hub 102 of which is internally splined to fit over the external splines 69 of the shaft 68. The carrier 99 has a series of angularly spaced studs 104 each of which has rotatable thereon a planet pinion 105 provided with a bearing bushing 106. A washer 101 and rivet 103 holds each pinion from axial movement.

A sun gear 108 having a bearing bushing 109 is freely rotatable on the outside of the shaft 68 and has integral therewith the inner member 110 of a roller brake with which rollers 112 and outer ring 113 cooperate to prevent backward rotation of the sun gear, the usual springs 111 and plungers 117 being provided to urge the rollers toward operative position. By backward rotation is meant anticlockwise when viewed from the left of Fig. 1. The outer ring 113 and a retaining cover 97 are held to the partition plate 32 by the rivets 121.

The sun gear is in constant mesh with the planet pinions. The roller brake may be broadly designated by the numeral 107.

The ring gear 114, also in constant mesh with the planet pinions, has a forwardly extending hub 115 provided with a bearing bushing 116 which is freely rotatable on the carrier hub 102. A ring gear driving member 118 has a rearwardly extending hub 119 also fitted over the bearing bushing 116. The hubs 115 and 119 are end splined together at 120.

The front gear housing 29 has a forwardly extending hub 122 provided with a bearing bushing 123 in which the hubs 115 and 119 are runningly fitted. The forward end of the hub 122 is enlarged to contain the annular groove 124 which catches any oil escaping from the end of the bushing 123 and returns it through the hole 125. An oil throw rib 128, formed on the ring gear driving member 118 assists in confining the leakage oil to the groove 124.

A second annular groove 129 is formed in the ring gear driving member 118, this second groove being provided to collect any oil which may escape between the hub 102 and bushing 116. Small holes 130 are provided to transfer any oil collected in the groove 129 to the groove 124. A cork washer 131 retards the leakage along shaft 68.

An end thrust bearing ring 132 is preferably made from graphite impregnated bearing metal such as is now commercially available for clutch thrust bearings. The ring 132 has an oil throw rib 133 around it which assists in throwing off the escaped oil.

A circular row of shouldered pins 134 are secured in the ring 132 and are freely slidable through holes in the front clutch frame 73, their ends normally bearing against the end of the hub 83 of the front clutch pressure plate.

The ring gear driving member 118 has a rim 135 the outside of which is provided at suitably spaced intervals with slots 136 which extend entirely through the rim. Slots 136 fit over the rollers 66 closely but runningly, whereby the driving member 118 may shift axially with respect to the clutch plate 62 while under load.

A bronze washer 140 limits forward movement of the ring gear to the position shown, its rearward movement being arrested when the space 141 is taken up. A thrust washer 142 as well as the bearing bushing 143 which rotatably supports the forward end of the shaft 68 may preferably be made of graphite impregnated bearing metal. Near the rear end the shaft 68 is rotatably supported in a ball bearing 144 fitted in the hub of the partition plate 32.

While the shaft 68 is the output shaft of the front transmission gear set it is the input shaft of the rear transmission gear set, extending through the partition 32 into the housing 30 and carrying at its rear end the sun gear 146 of the rear transmission gear set.

The output shaft 148 of the rear transmission gear set is rotatable at the front end in a bearing bushing 150 press fitted into the rear end of shaft 68, and near the rear end in a ball bearing 152.

A series of planet pinions 154, having bearing bushings 155, are in constant mesh with the sun gear 146, and are rotatably supported on studs 156 circumferentially spaced in a planet pinion carrier, the carrier comprising a front member 158 and a rear member 160, held together by bolts 162 passing through hubs 164 (see Figs. 10 and 11) circumferentially spaced intermediate the planet pinions.

The carrier rear member 160 has a long rearwardly extending hub which is internally splined to fit snugly over the external splines 166 of the shaft 148. The ring gear 168 also has a long rearwardly extending hub which is provided with a bearing bushing 170 which is freely rotatable on the outside of the hub of member 160.

A small drum 172 for holding the ring gear 168 against backward rotation has its forwardly extending hub internally splined to fit snugly over external splines 174 on the hub of the ring gear, which, together with a snap ring 176 fitted into an annular groove in the hub of the ring gear fastens the drum 172 to the ring gear 168 so they may rotate or move axially only in unison.

The inner member 178 of the roller brake is piloted in the rear wall 34 of the housing 30 and secured to the wall by a series of rivets 180 (see Fig. 6). The member 178, rollers 182 and outer ring 184 constitute the braking means for holding the ring gear 168 against backward rotation. A retaining plate 186, also secured by the rivets 180, holds the rollers 182 and ring 184 against axial displacement but permits their rotation. The usual springs 183 and plungers 185 are provided to maintain roller engagement. The brake member 178 is internally ground to true concentricity and size to receive the ball bearing 152.

The outer ring 184 has a series of external slots 188 which fit over rollers 190 closely, the rollers being rotatably supported on studs 192 circumferentially spaced in the rim of the drum 172, whereby the ring gear may be held against its rearward reaction yet offers substantially no resistance to being moved axially while so held.

The considerable number of rollers and the relatively great distance of the rollers from the axis of rotation fixes the unit load per roller at a safe low value. The roller brake for the rear gear set may be broadly designated by the numeral 195.

The shaft 68 has external splines 194 over which the internally splined hub of a clutch drum 196 fits snugly. The carrier front member 158 is provided with a press fitted bearing bushing 159 which is freely rotatable on the hub of the drum 196. The outer rim of the drum 196 has internal splines 198 slidably fitted into the notches of a series of clutch discs 200 (see Figs. 1 and 10). The rear clutch frame 202 is secured to the carrier member 158 by screws 204, and has external splines 206 slidably fitting the notches of a second series of clutch discs 208 which interspace the first series.

At the rear end the clutch frame 202 is provided with pairs of hinge ears 210 between which the weights 212 of the rear clutch (see Fig. 8)

are swingably supported by the hinge pins 214. Each weight has a pair of rollers 216 rotatable on the pins 218 and held thereon by washers 220 riveted to the ends of the pins. The weights are so shaped that their inward swinging about the hinge pins 214 is arrested at the position shown, by contact with the rear ends of the ears 210.

The rear clutch pressure plate (see Figs. 1 and 10) comprises a body portion 222 with a series of fan shaped pressure pads 224 extending outwardly intermediate pairs of hinge ears 210. The body 222 is counterbored on the front face for the thrust washer 226 and on the rear face has a series of circumferentially spaced wells which receive the front ends of the springs 228.

A spring compressing member comprises a plate 230 having a series of fan shaped fingers 232 corresponding in size to the fan shaped pressure pads 224 and also received between pairs of hinge ears 210, the plate 230 having on its forward face a series of circumferentially spaced wells which receive the rear ends of the springs 228. The hub of the plate 230 is provided with a bearing bushing 234 slidable axially on the hub of the drum 172. The fan shaped fingers 232 each lie with their rear surfaces against a pair of rollers 216. The rear clutch may be broadly designated by the numeral 235.

The output shaft 148 of th rear transmission gear set is also the input shaft of the reversing gear set, extending through the rear wall 34 of the housing 30 into the reverse gear housing 33, where, at its extreme rear end it carries the reversing sun gear 236.

The tail shaft 238 is rotatably supported at the rear end by the ball bearing 240, held in the housing 33, and at the front end by the bearing bushing 242 which is press fitted in the rear end of the shaft 148. The larger diameter of the tail shaft 238 abuts a counterbored shoulder in the rear end of the sun gear 236 and thereby prevents the tail shaft from moving axially forward.

The ball bearing 240 is held on the tail shaft by the screw 244 acting through the washer 246 and universal joint member 248. The usual speedometer gears 250 and 252 are provided as well as a seal member 254 and oil throw 256. The ring gear 258 is shown integral with the tail shaft 238 but may be made separately and secured thereto.

The reversing planet pinion carrier 260 is provided interiorly with the bearing bushing 262 within which the shaft 148 may rotate. Integral hollow hubs 264 extend toward each other to rotatably support the planet pinions 266 in constant mesh with both the sun gear 236 and ring gear 258. The pinions 266 are provided with bearing bushings 268 which are rotatable on the hubs 264. A carrier rear bearing member 270 is held to the carrier 260 by the bolts 272. A bearing bushing 274 is press fitted into the member 270, and the tail shaft 238 is rotatable in the bushing.

Near the forward end, the carrier 260 is grooved for the shifting collar 276. At the extreme forward end, the carrier has external teeth 278 adapted to fit slidably into the internal teeth of the plate 280, the plate being secured to the wall 34 by the rivets 180 (see Fig. 6). The carrier has also internal teeth 282 adapted to fit slidably over the teeth of the sun gear 236.

A forward and reverse shifting fork 284 (see Fig. 12) has two studs 286 extending radially into openings in the shifting collar 276. One side of fork 284 is swingable on the bearing stud 287 which is screwed into the hub 288 of the housing 33. A bushing 290 is press fitted into the fork and runningly fitted over the stud 287. The other side of the fork is internally splined at 292 for the external splines of the reversing lever 294, which is rotatable in the hub 296 of the housing 33.

A beveled valve like seat 298 in the outer end of the hub 296 and a correspondingly beveled shoulder on the reversing lever 294 is provided to prevent leakage of lubricant from the housing. A detent bracket 300 is held to the housing 33 by screws 302.

A detent ball 304 is pressed by a detent spring 306 into a seat 308 adapted to hold the lever 294 in the neutral position, several like seats, not shown, being positioned to hold the lever in the forward and reverse positions. A spring 310 keeps the beveled shoulder of the lever 294 against the beveled seat 298.

The lower end of the lever 294 is provided with a hub 312 to which any suitable operating means may be attached and extended to a position convenient for the operator.

The reversing mechanism just described is shown in my copending application Serial No. 180,174, filed December 16, 1937, and is included herein only to provide a complete operative mechanism.

The entire transmission is lubricated by tapping the main oiling system of the engine, whereby no separate pump or oil reservoir is required, the same oil as is used for the engine being also suitable for the transmission. The oil is forced out through the rear end of the crank shaft into the hollow interior of the shafts 68, 148, and 238, from which it is distributed through a series of radial holes to points requiring lubrication.

Centrifugal force is depended upon to carry the oil from the interior of the shafts to the bearings, and the oil is preferably not maintained under pressure. To insure this condition, the holes 324 in the tail shaft 238 are so located that one is always open.

Because of the fact that the central openings of the shafts vary in diameter, some oil is always trapped and retained in the shafts and is therefore available for starting, until the pump delivers a new supply.

Since the oil is not delivered under pressure, a packing washer 314 effectively prevents leakage of oil between the shaft 68 and bushing 143. Holes 316 transfer any slight amount of leakage oil to the outside of the clutch housing. Oil return holes 318 and 320 in the bottom of the housings 33 and 30, and a tube 322 lying on the bottom of the clutch housing 26 return the oil thrown from the transmission parts to the oil sump of the engine.

Proportion

While the structure shown may be proportioned for use with an engine of any horsepower and with any vehicle weight within reason, some suggestion as to proportion and procedure in obtaining same for a given vehicle, may preferably be given.

If the largest diameter of the clutch housing 26 is taken as 15½ inches and all other parts made to the same scale, the mechanism will be suitable for an engine capable of delivering 110 H. P. at 3600 R. P. M. in a vehicle of approximately 3500 lbs. weight.

In the reverse gear set where quiet operation and long wear is not the prime consideration, a stub tooth design is advisable for strength. The gearing selected is 12-14 stub tooth, 20 degree pressure angle, straight spur teeth. The ring gear has 60 teeth on a pitch diameter of 5 inches, the sun gear 30 teeth on a pitch diameter of 2½ inches, and the planet pinions 15 teeth on a pitch diameter of 1¼ inches.

The sun gear is the driver, the ring gear is the driven, and the carrier is stationary. The ratio, through the reversing gear set only, is therefore $$\frac{R}{S} = \frac{60}{30} = 2$$

input revolutions forward to one output revolution backward.

Where four forward ratios are provided in an automotive transmission, the "spread" is usually slightly greater than in three speed transmissions. Thus, while in a given vehicle with a three speed transmission the engine-to-wheel ratio for low gear might be 11 to 1 and for high gear 3.8 to 1, with a four speed transmission in the same vehicle the average present practice is to have a low gear ratio of slightly under 12 to 1 and a high gear ratio of slightly over 3 to 1.

In order then to provide a second and third ratio properly spaced between low and high, with the spacing substantially in a geometrical progression, the front and rear transmission gear sets should have a rather definite relation to each other, the speed reducing capacity of the second preferably being as nearly as may conveniently be had ⅔ that of the first, the first being driven by the engine and the second by the first.

For the second or rear transmission gear set, the gearing selected is 15 pitch, 20 degree pressure angle, 30 degree helix angle. The ring gear has 72 teeth on a pitch diameter of 5.543 inches, the sun gear 48 teeth on a pitch diameter of 3.695 inches and the planet pinions 12 teeth on a pitch diameter of .924 inch.

Since the sun gear is here on the driving member, the ratio through the rear transmission gear set alone is $$\frac{R+S}{S} = \frac{72+48}{48} = 2\frac{1}{2} \text{ to } 1$$

The "hand" of the internal teeth of the ring gear should correspond in direction to the threads of a right hand nut.

For the front transmission gear set, the gearing selected is 16 pitch, 20 degree pressure angle, 34 degree helix angle. The ring gear has 60 teeth on a pitch diameter of 4.524 inches, the sun gear 30 teeth on a pitch diameter of 2.262 inches, and the planet pinions 15 teeth on a pitch diameter of 1.131 inches.

Since the ring gear is here on the driving member, the ratio through the front transmission gear set alone is $$\frac{R+S}{R} = \frac{60+30}{60} = 1\frac{1}{2} \text{ to } 1$$

The "hand" of the internal teeth of the ring gear should correspond in direction to the threads of a left hand nut.

The degree of the helix angle required on the teeth of both front and rear transmission gear sets is given along with the numbers of teeth and pitch diameters, but it should be understood that the pitch diameters depend on the helix angle, and the helix angle is not at this stage available because it is governed by the size and engaging pressure of the clutches which engage to eliminate the gear sets from action. The method of determining this helix angle by means of the clutch data will later appear, but the numbers of teeth in the gearing being now fixed, the engine-to-wheel ratios for the four speeds may be determined.

With 110 H. P. in a vehicle weighing 3500 lbs. and having 29 inch wheels, the rear axle may preferably have a ratio of 3.111 to 1. The four forward ratios will then be

```
Ratios   = front  × rear  × axle    = engine-to-wheel
Low      = 1½     × 2½    × 3.111   = 11.666 to 1
Second   = 1      × 2½    × 3.111   =  7.777 to 1
Third    = 1½     × 1     × 3.111   =  4.666 to 1
High     = 1      × 1     × 3.111   =  3.111 to 1
```

Reversing will always begin with the transmission gears in low and the ratio will therefore be 11.666×2=23.333 to 1. If the load is light and the speed considerable the transmission gears may shift up to second, third or even high during the reversing operation, in which case the reverse ratio might be 15.555 to 1, 9.333 to 1, or 6.222 to 1. The foregoing ratios correspond to present practice when four forward speeds are provided.

The proportion of the main engine clutch 70 presents no intricate problem. The torque which a dry plate clutch of a given diameter and under a given engaging pressure will transmit is fairly well established. Having selected the largest diameter conveniently contained in the space available, and determined the engaging pressure needed to transmit the torque of the engine designated, the weights 50 may be readily determined. They may be found in the instant case by scaling the drawings. The springs 58 which restrain the weights 50 should, however, be so proportioned that they will oppose and prevent the weights applying sufficient pressure to carry the full engine torque until the engine is revolving at a speed at which it can deliver substantially its full torque. The springs 58 are so proportioned that they oppose the weight force to such an extent that, while the clutch first engages with a light pressure at 400 engine R. P. M. it does not engage with maximum pressure until the engine reaches the speed of approximately 800 R. P. M., which makes for a more gentle engagement.

The springs, to balance the weights to this extent, should preferably be made of .072 inch round wire coiled ⅝ inch pitch diameter, with nine coils, and have a free length of 2.18 inches.

The proper proportioning of the front transmission clutch 100 is more involved than that of the main clutch. Having selected the largest dry plate which will go in the space available, the engaging pressure which will carry the full torque of the engine selected, that is, 186 ft. lbs. is tentatively determined. In the instant case this will be around 460 lbs.

In the charts Figs. 16 to 19 inclusive, the construction and use of which will later be more fully explained, it may be seen that a horizontal line drawn from 460 of the left hand column marked "front weight force, lbs." will correspond to 186 in the right hand column marked "front clutch capacity, ft. lbs." Similar horizontal lines will indicate the ft. lbs. capacity of the clutch for other weight forces. The weight forces vary, of course, with the speed of rotation.

To obtain a suitable overlap between shift up and shift down in the front transmission gear set, the axial thrust of the ring gear 114 may now be tentatively selected at approximately 25 percent greater than the clutch engaging pressure, 460 lbs., required to transmit the maximum engine torque. 460×1.25=575 lbs. axial thrust of the front gears at maximum torque, 186 ft. lbs.

In Fig. 19, the curve t—11 represents the maximum torque curve of the engine herein selected for illustrative purposes, and while the maximum torque is seen to be 186 ft. lbs., the torque at the highest H. P. point, i. e., 3600 R. P. M. is seen to be 160 ft. lbs. The maximum tangential load at the pitch line of the front ring gear at 3600 R. P. M. is therefore $$\frac{1 \text{ ft.}}{\text{Ring gear radius}} = \frac{12 \text{ inches}}{2.262 \text{ inches}} \times 160 = 849 \text{ lbs.}$$

By selecting a helix angle for the ring gear of 34 degrees, we have tan. 34°×849=573 lbs. which is near enough to the 575 lbs. axial thrust above tentatively selected for the ring gear. This thrust will be forward, i. e., toward the engine.

The springs 92 are now so proportioned that when the weights 75 reach a position in their outward swinging movement where a roller 79 has passed through an arc of 50 degrees, i. e., when they have moved from the 10 degree position shown to the 60 degree position, the stress of the eight springs will be 573 lbs. or just equal to the axial thrust of the ring gear 114.

The springs 94 should therefore be made of .135 inch round wire, coiled ⅞ inch pitch diameter, have 4.44 coils and a free length of 1.3649 inches. When in place as shown in the drawings, the springs are 1.250 inches long and the eight springs together are under an initial stress of 135.04 lbs. When the weights have reached the 60 degree position, the spring stress of the eight springs will be 573 lbs., the axial thrust of the front ring gear at maximum H. P. point.

The weights 75 are so proportioned that when they are in the 60 degree position they will hold the springs to a length of .876 inch at which point they will be under a stress of 573 lbs., the weight in pounds of the weights being such that they will have the requisite force when rotating 2400 R. P. M. which is the speed of the weights when driven through the front gear set by the engine rotating 3600 R. P. M. the point of maximum H. P.

It follows that, when the maximum torque of the engine designated is being transmitted through the front gear set only, and the vehicle speed is constantly increased thereby, the stress of the springs will reach 573 lbs. at 3600 R. P. M. of the engine.

Since 573 lbs. is the maximum ring gear thrust at 3600 engine R. P. M., any further increase in the speed of the engine will lower its torque below 160 ft. lbs. (see torque curve t—11, Fig. 19) which will at once result in the springs 92 overcoming the ring gear thrust, and the first transmission clutch 100 will be engaged.

The foregoing proportions between the helix angle of the gear set which supplies the thrust necessary to keep the clutch from engaging and eliminating the gearing, and the centrifugal force of the weights which tend to engage the clutch, show that while the operator may retain the gearing in effect by the application of sufficient engine torque, he may not hold the gearing in effect after the engine has reached too high a speed to operate safely or efficiently, and he may hold it in effect that long only by the application of full engine torque.

Now while the application of the maximum possible torque to the front ring gear kept the front clutch from engaging, and thus kept the front gear set operating up to 3600 engine R. P. M., a lesser torque application will keep the front gear operating only to a proportionately lower engine speed.

If, however, the centrifugal weights 75 were of conventional design and therefore applied their clutch engaging force directly, or through an unvarying leverage, engagement of clutch 100 would not likely be enforced at any relatively low speed for the following reasons:

Centrifugal force varies with the square of the R. P. M. so that, if the weights 75 were arranged conventionally, and were made just large enough to provide the necessary 573 lbs. force at 3600 engine R. P. M., which is 2400 weight R. P. M., then the curve n, Fig. 19, would represent the force at less R. P. M. From the curve n it will be seen that a conventional weight arrangement which will produce 573 lbs. at 2400 R. P. M. of the weights will, at 800 R. P. M. of the weights, that is, at ⅓ the speed, produce only ⅑ the force, or about 64 lbs.

It is obvious that, at low driving speeds, it would be impossible to eliminate the front gear without reducing the applied torque to a value too low for attaining any substantial vehicle speed. The proportion and arrangement of the weight mechanism shown obviates the foregoing difficulty.

Fig. 1 shows a weight 75 in place and in the "clear in" position a line drawn through the center of the hinge pin 76 and the roller 79 the center of which is at the center of gravity of the weight, is at an angle of 10 degrees with the transmission axis. When the weight reaches the "clear out" position it will have shortened the springs 92 to half their original length, and the same line will be at an angle of 80 degrees with the transmission axis.

Obviously, if the weight were allowed to swing out until the line was 90 degrees with the transmission axis no amount of increase in the speed of rotation would further increase the force applied to compress the springs 92.

Fig. 14 shows diagrammatically the constantly diminishing leverage through which the weights 75 apply their force to the springs 92 as the weights swing outward.

The point O represents the center of a hinge pin 76. The points A, B, C, D, E, F, G, and H represent the center of a roller 79 or the center of gravity of a weight when at 10, 20, 30, 40, 50, 60, 70, and 80 degrees of outward movement.

Obviously, since the centrifugal force is radial, and the force of the resisting springs is axial, the effective leverage, through which the centrifugal force is applied to the spring resistance at any point from A to H will be $$\frac{\cos}{\sin}$$

of the angle with the axis.

The radius between the hinge pin 76 and the roller 79 is .770 inch. The diagram Fig. 14 therefore has tabulated the sines and cosines of the angles 10 to 80 degrees multiplied by .770 inch.

The difference between the cos 10°×.770 and the cos 20°×.770 will, of course, be the movement of the spring compressing plate 86 caused by movement of the roller 79 from A to B. In the table this is .0347 inch. In like manner the total movement of the plate 86 is tabulated for positions from B to H.

From the dimensions representing the movement of the spring compressing plate, the length of the springs when the weights are at points A to H may be found. Since the spring lengths are slightly different for any point when the clutch 100 is engaged than when it is disengaged, one column shows the spring lengths when the front clutch is operating, and the next column the spring lengths when the front gear is operating. From the spring lengths, their stresses may be found, and the next two columns show the pounds stress stored in the springs at the several spring lengths.

Having found the spring stress which the weights must overcome to reach any point A to H, and the distance from the axis of the transmission to each point, and the leverage, $$\frac{\cos}{\text{sine}}$$

of the angle with the axis, through which the centrifugal force of the weights must act on the springs at each point, the R. P. M. at which the weights will reach any given point may readily be calculated.

Having determined the maximum front gear thrust at 3600 R. P. M. to be 573 lbs. it remains to so design the weights that they will provide an axial clutch engaging pressure of 573 lbs. when the engine is revolving 3600 R. P. M., at which speed the weights will be revolving 2400 R. P. M.

While the angular position of the weights, at which they are made to generate an axial force equal to the axial thrust of the gears, may preferably be somewhere between 50 and 80 degrees, the 60 degree point is selected in the instant case. The greater the angular position selected, at which the weight force balances the gear thrust for enforced shift up, the more convex the controlled centrifugal force curve will be. Selection of the 60 degree point, produces a curve which is almost a straight line up to 2400 weight R. P. M., the maximum weight speed which may be reached without a shift up in ratio.

Having adopted the 60 degree position as the point of enforced shift up, the leverage, $$\frac{\cos 60°}{\text{sine } 60°} = \frac{.5}{.866}$$

through which the weights act, the distance, 5.1668 inches, of the centers of gravity of the weights from the axis of rotation, the axial force, 573 lbs., which must be the same as the spring stress at this point, have at this stage already been found and tabulated in Fig. 14. The R. P. M. 2400 at which the force is desired is known. A weight is then to be designed which will produce that axial force at that speed through that leverage rotating at that radius from the axis and at that angle with the axis.

The well known formula for centrifugal force is (1) $F = .0000284\ WRN^2$ in which F is the centrifugal force in lbs., W the weight in lbs., R the radius in inches, and N the R. P. M. From this the axial force F' resulting after acting through the above leverage $$\frac{.5}{.866}$$

will be (2) $F' = .0000164\ WRN^2$ which transposed is (3) $$W = \frac{F'}{.0000164 RN^2}$$

wherein the axial force F' is 573 lbs., R=5.1668 inches, and N=2400 R. P. M. whereby $N^2$=5,760,000 which makes W=1.176 lbs. This value, of course, represents the total of the eight weights together.

Having found that a weight W=1.176 lbs. swung to 60 degrees, with center of gravity 5.1668 inches from the axis, acting through a leverage of $$\frac{.5}{.866}$$

will create an axial force equal to the spring stress of 573 lbs. when revolving 2400 R. P. M., it remains to be found at what R. P. M. the weights must be rotating to reach each of the several angular positions and generate the several tabulated spring stresses at the several distances from the axis through the several leverages tabulated in diagram Fig. 14.

Beginning again with the well known formula (1) $F = .0000284\ WRN^2$, the axial component of F after acting through the several leverages effective at the several positions A to H will be (4) $$F' = F \times \frac{\cos.\ a}{\text{sine } a}$$

where $a$ is the angle with the axis to which the weight is swung.

From equation (1) $$N = \sqrt{\frac{F}{.0000284\ WR}} = 187.6\sqrt{\frac{F}{WR}}$$

but from equation (4) $$F = F' \times \frac{\text{sine } a}{\cos.\ a}$$

therefore (5) $$N = 187.6\sqrt{\frac{F'\ \text{sine } a}{WR\ \cos.\ a}}$$

and since W=1.176 lbs., (6) $$N = 173\sqrt{\frac{F'\ \text{sine } a}{R\ \cos.\ a}}$$

where $a$ is the angle to which the weight has swung in its outward movement.

From Formula 6 the R. P. M. at which the weights will reach positions A to H, Fig. 14, may first be calculated for the first column of spring stresses F' representing the stresses when the clutch is engaged, and again for the second column of spring stresses F' representing the stresses when the gear is operating. From the latter two columns the curves b and a respectively of Figs. 16 to 19 are plotted. Curve a will show by a column at the left of the charts the force which the front weights generate at a given speed, while the front gear set if in effect, tending to eliminate the gear and engage the front clutch. The curve b will show by the same column the force which the front weights generate at a given speed to hold the front clutch in engagement once it is engaged. A column at the right of the charts shows the torque carrying capacity of the front clutch at any speed at which it may be operating.

The curve a shows that at 3600 engine R. P. M., the weights 75, revolving 2400 R. P. M., will stress the springs 92 with a force of 573 lbs. while at 1200 engine R. P. M., the weights, revolving 800 R. P. M., will stress the springs with a force of 212 lbs. Thus at 1200 engine R. P. M. it will be necessary for the operator to apply at least 59 out of the possible 183 ft. lbs. engine torque available at 1200 R. P. M. to prevent an enforced elimination of the front gearing in favor of direct drive through the front gear set.

Curve $n$, Fig. 19, shows that, with conventional centrifugal mechanism, no shift up out of the front gear drive could be had at 1200 engine R. P. M. unless the torque application was reduced to 17 out of the possible 183 ft. lbs. available.

Obviously, with conventional centrifugal mechanism, the operator would be unable to rid himself of the front gear even though the load-conditions were light enough to make such a course desirable.

When the clutch 100 engages, the engine speed will be the same as the weight speed, and the weight speed must be taken directly from the figures at the top of the curve charts without dividing the figures by 1½ as before.

From curve $b$, Fig. 19, it may be seen that, if the clutch 100 is engaged, and the speed of the engine is as much as 2040 R. P. M., the springs 92 will be holding the clutch in engagement with a force of about 460 lbs., which is the force tentatively established hereinbefore as suitable to enable the clutch to carry the maximum torque which the engine can produce at 2040 R. P. M., its highest torque point.

Obviously, if the clutch 100 is once engaged, and the engine is rotating above 2040 R. P. M., the application of even the maximum torque which the engine can develop will not cause a shift down into front gear operation. At 1000 engine R. P. M., however (see Fig. 19), the curve $b$ shows that, if the clutch 100 is engaged, and a sudden spurt of power is needed, the clutch capacity is such that the application of 92 ft. lbs. out of the 182 maximum possible ft. lbs. at that speed, will shift down and make the front gearing available for delivering more torque to the wheels.

Thus it will be seen that if the front gear is operating, it may be retained by the operator by keeping the curve of the engine torque he is applying anywhere above the horizontal line at that time reached by the curve $a$.

There comes a time, however, at 3600 engine R. P. M., when the engine is incapable of producing torque above the horizontal line reached by the curve $a$, and an enforced shift up out of the front gear will occur. This is as it should be, for there is no justification in retaining a reduction gear in effect after the engine speed can rise no higher without losing power.

The procedure for proportioning the rear transmission clutch and the helix angle of the gears of the rear gear set, the clutch engaging springs and weights, is substantially the same as for the front gear set just described.

The rear transmission clutch 235 is required, at times, to carry the full engine torque of 186 ft. lbs. multiplied by the ratio of the front gear set which is 1½ to 1 when that is operating. The required carrying capacity of the rear clutch is therefore 1½×186=279 ft. lbs. which is rather beyond that of a single plate clutch such as is used with the front gear set.

Clutch 235 is therefore preferably made a multiple disc clutch, but the weight and spring mechanism employed for engaging it, and the helical gear tooth angle employed for opposing engagement, is the same principle as is employed in the front gear set and clutch arrangement.

Having selected the inner and outer diameters of the disc and the number of discs which may conveniently go in the space, and determined the rubbing surfaces in contact, and the mean diameter of a disc, the axial pressure required to carry the 279 ft. lbs. may be determined by comparison with similar clutches in use. In the instant case, such comparison indicates the size and number of disc shown, gives the clutch a capacity of 279 ft. lbs, with 480 lbs. axial pressure.

To obtain a suitable overlap between shift up and shift down in the rear gear set, the axial thrust of the rear ring gear 168 may now be tentatively selected at approximately 25 percent above the maximum clutch engaging pressure, which will be 480×1.25=600 lbs. Since the engine torque at the highest H. P. point, 3600 R. P. M., is 160 ft. lbs. (see curve $t$—11 of Fig. 19), the maximum tangential load at the pitch line of the rear sun gear 146, with the front gear set inoperative, is $$\frac{12}{1.8476} \times 160 = 1040 \text{ lbs.}$$

In this type of gear, the tangential loads in lbs. at the pitch lines of the sun gear and ring gear are always equal, so that the load at the pitch line of the ring gear 168 is also 1040 lbs.

By selecting 30 degrees as the helix angle of the ring gear we have tan. 30°×1040=600 lbs. axial thrust of the ring gear upon application of 160 ft. lbs. torque to the sun gear. This thrust will be rearward, away from the engine.

The springs 228 are now so proportioned that when the weights 212 reach the 60 degree position in their outward swinging movement, the stress of the eight springs will be 600 lbs. or just equal to the axial thrust of the ring gear 168.

The springs 228 should therefore be made of .148 inch round wire, coiled 1⅝ inch pitch diameter, have 5 coils, and a free length of 1.4427 inches. When in place as shown in the drawings, the springs are 1.376 inches long and the eight springs are together under an initial stress of 83.84 lbs.

It should here be stated that, in designing the springs 228 as well as the front springs 94 of the front gear set, any considerable amount of initial stress should be avoided because, until a centrifugal weight force is generated which exceeds the initial stress of the springs, the clutch engaging force curves will behave as with conventional centrifugal weight design, that is, they will be concave like curve $n$ instead of convex like curves $a$, $b$, $c$, or $d$.

The small concave portions at the lower ends of curves $a$, $b$, $c$, and $d$ show the effect of the initial stress in springs 94 and 228. When the weights have reached the 60 degree position, the spring stress of the eight springs will be 600 lbs., which is the axial thrust of the rear ring gear at the maximum H. P. point.

The weights 212 are now so proportioned that when they are in the 60 degree position they will hold the springs to a length of .9648 inch, at which point they are under a stress of 600 lbs., the size of the weights being such that they will have the requisite force when rotating 1440 R. P. M. which is the speed of the weights when being driven by the engine at 2½ to 1 through the rear gear set when the engine is rotating 3600 R. P. M., the point of maximum H. P.

It follows that, when the maximum torque of the engine designated is being transmitted through the rear gear set only, and the vehicle speed is being constantly increased thereby, the stress of the springs will reach 600 lbs. at 3600 R. P. M. of the engine, and since 600 lbs. is the maximum ring gear thrust at 3600 engine R. P. M., any further increase in the engine speed will lower its torque below 160 ft. lbs. (see torque curve t—11, Fig. 19) which will at once result in the springs 228 overcoming the ring gear thrust, whereupon the rear transmission clutch 235 will be engaged.

The foregoing shows that an operator may not hold the rear gear in effect with the engine revolving more than 3600 R. P. M. its maximum H. P. point, and the speed at which it will operate safely and efficiently, and he may hold it in effect that long only by the application of full engine torque.

Fig. 15 shows diagrammatically, the constantly diminishing leverage through which the rear weights 212 apply their force to the springs 228 as the weights swing outward. Point 0 represents the center of a hinge pin 214. The points A to H, the center of a roller 216, which is also the center of gravity of the effective portion of a weight at 10 to 80 degrees outward movement.

The effective leverage through which the centrifugal force is applied to the spring resistance at any point from A to H is, the same as in the front weights, $$\frac{\cos}{\sin}$$

of the angle with the axis of rotation.

The radius between the hinge pin 214 and the roller 216 is .850 inch. The diagram Fig. 15, therefore, has tabulated the sines and cosines of the angle 10 to 80 degrees × .850 inch.

The spring lengths, spring stresses, and R. P. M. of the weights necessary to produce the stresses are found and tabulated in Fig. 15 in the same manner as explained relative to Fig. 14, and with the same formulae, and the curves c and d of Figs. 16 to 19 are plotted therefrom.

By consideration of Figs. 16 to 19 it will be seen that, with the application of a given engine torque, the front gear thrust and the rear gear thrust differs in but a small degree, but the rear clutch capacity for the same torque application differs from the front clutch capacity in a ratio of approximately 1½ to 1. This arrangement and proportion is an important feature of the invention, it being the reason why during a period of acceleration of a vehicle, the front gear set will first shift from gear drive to direct, leaving the rear gear set in effect, then the rear gear set will shift from gear drive to direct, and, although the vehicle speed is now higher, the front clutch will let go and bring the front gear back into play, with the rear gear in direct drive, and subsequently, at a higher speed, the front clutch will re-engage to provide high gear.

The manner in which this is accomplished will become more clear by considering several ways in which the engine torque may be applied by an operator, and the result of such torque application. These several ways are hereinafter described with particular reference to Figs. 16 to 19 inclusive.

*Operation*

The normal condition of the mechanism, that is, the condition which exists when the engine is at rest or is idling below 400 R. P. M. is that shown in the drawings, where the centrifugal weights of the main clutch 70, the front transmission clutch 100, and the rear transmission clutch 235 are all in their "clear in" positions and the reversing gear set is in neutral. In this condition the engine may be started and run to limber it up if desired.

As the engine speed rises, the clutch 70 first engages and operates the front transmission gear, which in turn rotates the shaft 68, which in turn operates the clutch 100. The weights of the transmission clutches also operate in and out at certain points in the rise and fall in speed. This not only limbers up the engine but the entire transmission mechanism as well. No power is transmitted to the wheels because the reversing gear is in neutral.

To set the reversing gear for moving the vehicle backwardly, the hub 312 of the reversing lever 294 is moved rearwardly, which draws the carrier 260 forwardly and engages the carrier clutch teeth 278 with the internal teeth of the clutch plate 280. When the carrier 260 is thus held non-rotative, forward rotation of the sun gear 236 will cause rearward rotation of the ring gear 258, and the vehicle will move backwardly.

For all forward driving, the hub 312 of the reversing lever 294 is drawn forwardly, which pushes the carrier 260 rearwardly until the internal clutch teeth 282 slide over the teeth of the sun gear 236. The teeth of the planet pinions 266 being still meshed ⅓ of their length in the teeth of both the sun gear 236 and ring gear 258, a locked up condition is provided wherein the tail shaft 238 must rotate in unison with the transmission output shaft 148.

If the engine is now speeded up above 400 R. P. M., the main clutch 70 will engage, drive the front ring gear 114 which starts revolving the front sun gear 108 backwardly which is immediately arrested by the roller brake 107, whereupon the carrier 99 rotates forwardly at reduced speed.

The carrier 99, being secured to the shaft 68, the sun gear 146 of the rear gear set turns forwardly which starts the ring gear 168 rotating backwardly, backward rotation being immediately arrested by the roller brake 195, whereupon the shaft 148 rotates forwardly at a further reduced speed. This provides low gear, the engine-to-wheel ratio being 11.666 to 1.

As soon as the vehicle starts moving, the clutches 100 and 235 start rotating whereupon the weights 75 and 212 start moving outwardly to compress the clutch engaging springs 92 and 228. There is an unvarying position of the weights and an unvarying stress in the springs for any given vehicle speed. Whether this stress will engage the clutches 100 and 235 or not will depend on the axial thrust of the ring gears 114 and 168. If this thrust is zero, as for instance when the vehicle is allowed to start itself on a steep down grade, the clutches 100 and 235 will engage immediately upon vehicle movement.

This is important, for it insures engine braking under any and all circumstances, even when the engine is dead or is idling and the main clutch 70 is therefore disengaged. It also permits the engine to be started when the battery is dead by pushing the vehicle. Of course, after the engine is rotated through the clutches 100 and 235, by vehicle movement, to a speed of 400 R. P. M. or more, the main clutch 70 will automatically engage.

If, on the other hand, a start is being made against vehicle resistance as is substantially always the case, then the two ring gears will provide thrust in proportion to that vehicle resistance to oppose clutch engagement, and their engagement will consequently be proportionately delayed.

In starting from a dead stop, the mechanism will always be coupled for low gear. What manner of ratio shifting takes place after that, and at what speed it will take place, will depend entirely upon how and what amount of torque is applied and to what extent the vehicle may respond thereto, which of course depends on the grade or other vehicle resistances.

The points at which ratio changes will occur under different torque applications and driving conditions may best be understood from the charts 16 to 19 inclusive, where the force curves $a$ and $b$ of the front weights 75 and the force curves $c$ and $d$ of the rear weights 212 are shown, together with the torque curves $t-1$ to $t-11$ which represents different applications of torque by an operator.

The curve $a$ shows the force which the front weights exert to effect engagement at any speed at which they may be rotating while the front gear set is in operation. The curve $b$ shows the clutch engaging force of the front weights at any speed at which they may be rotating after the front gear set becomes inoperative and the drive is through the front clutch. This determines the capacity in ft. lbs. of the front clutch. The curve $c$ shows the force which the rear weights exert to effect clutch engagement at any speed at which they may be rotating while the gear set is in operation.

The curve $d$ shows the clutch engaging force of the rear weights at any speed at which they may be rotating after the rear gear set becomes inoperative and the drive is through the rear clutch. This determines the capacity in ft. lbs. of the rear clutch.

The curves $t$, $t-1$, $t-2$, etc., represent different torque curves created by a driver to effect vehicle acceleration, the charts showing the points of automatic changing of gear ratios corresponding to the relation between the torque applied and the vehicle speed attained under said torque.

City ordinances often limit vehicle speeds in business districts to 20 M. P. H., and in such places, after a vehicle has been brought to a dead stop, there is no advantage, when driving is resumed, in bringing the vehicle back to 20 M. P. H. through all four ratios of a four speed transmission, although with the throttle set at a fixed point this could be accomplished with the device here shown.

In such restricted zones the custom of experienced drivers when driving vehicles equipped with conventional three ratio hand shift transmissions, is to raise the vehicle speed from 0 to 20 M. P. H. in low gear, then hand shift directly from low to high.

Fig. 16 shows how the device herein shown may be operated in this desirable manner by creating a torque curve $t$, which may be done by momentarily stepping reasonably hard on the accelerator until the vehicle speed reaches approximately 20 M. P. H., then momentarily releasing the accelerator for a brief period, then thereafter limiting the torque created to that value which will not raise the vehicle speed beyond 20 M. P. H.

With a torque curve $t$, Fig. 16, the engine speed rises to point $f=2700$ R. P. M. Both the 1½ to 1 and the 2½ to 1 gear sets being operative, the front weight will be rotating $g=1800$ R. P. M. and the rear weights will be rotating $i=720$ R. P. M.

Since the curve $t$ has now fallen to $f$ which is on the same horizontal line to which the curve $a$ has risen when at $g$, that is, the engine torque is creating a front ring gear thrust of 451 lbs. and the front weights are creating a clutch engaging pressure of 451 lbs. If the torque being applied is now interrupted, the front clutch will engage, whereupon the engine speed is drawn down to $g=2700$ R. P. M.=the speed of the front weights. Further drop of the engine torque to $h$ will meet the horizontal line to which the curve $c$, representing the rear weight force, has risen, that is, to point $i=720$ R. P. M., whereupon the rear gear thrust and the rear weight force are both 304 lbs. and the rear clutch will engage. Thus by raising the vehicle speed to 20 M. P. H. in low gear, then suddenly releasing the accelerator, the mechanism shifts from low directly to high without going through second and third ratios.

After this compound shift, that is, both clutches engaging at once, the engine, the front weights and rear weights, will all be revolving 720 R. P. M., at which speed the rear weights hold the rear clutch engaged with a pressure which gives it a carrying capacity of 155 ft. lbs., (see horizontal line extended to the right from $j$), and the front weights will hold the front clutch engaged with a pressure which gives it a carrying capacity of 65 ft. lbs. (see horizontal line extended to the right from $k$).

It follows that, after the above compound shift at 20 M. P. H. has been made, an engine torque $t-1$ which is below the line representing 65 ft. lbs. engine torque, that is, at least ⅖ of the full engine power may be applied and still remain in high gear. If the torque is now raised to a value represented by the curve $t-2$, which does not rise above the horizontal line $l$ representing 155 ft. lbs. engine torque, which is the present carrying capacity of the rear clutch, the ratio will be drawn only from high to third gear, that is, after the compound shift up, the application of not more than 150 out of a possible 186 ft. lbs. engine torque will shift only back from high to third gear. A curve of greater torque $t-3$ and one of lesser torque $t-4$ are shown. Since the three curves $t$, $t-3$, and $t-4$ all arrive at the same place $f$, that is, since they all provide the same front ring gear thrust at 2700 engine R. P. M., the shift will be identical. The elapsed time, however, which is taken to accelerate from 0 to 20 M. P. H. in low gear is less upon application of the torque $t-3$ than upon application of the torque $t-4$.

Fig. 17 shows another torque application $t-5$ and its result. The torque is applied through low gear until the engine reaches $f=3000$ R. P. M. Both gear sets being operative, the front weights will be revolving $g=2000$ R. P. M. and the rear weights $e=800$ R. P. M. the vehicle speed being 22.2 M. P. H. Since the front weight force at $g$ balances the front ring gear thrust at $f$, the front clutch now engages for second speed and pulls the engine speed down to 2000 R. P. M.

Assuming that with a reduction in speed, the torque is held on the curve $t-6$, the torque after the shift up to second speed is at $m$. If the engine is now raised in speed through the torque curve $t-7$ until the engine speed reaches $h=2750$ R. P. M., the rear weights will be revolving $i=1100$ R. P. M., the vehicle speed now being 30.6 M. P. H. Since the rear gear thrust $h$ now balances the rear weight force $i$, both being 470 lbs., the rear clutch now also engages and tries to pull the engine speed down to 1100 R. P. M.

Now the better practice in any speed-torque transmission unit is to place the weights, which are to engage the clutch for a shift up out of gearing, on the driven member, for, when acceleration has proceeded to the point where the clutch engages, the driven member, being vehicle connected, will maintain its attained speed for a time on inertia, while the driving member must quickly fall in speed an amount equal to the gear ratio.

Placing the weights on the driven member therefore maintains the weight speed and therefore keeps the clutch, which the weights have engaged, in engagement after engagement has taken place.

Since in the example being discussed, the rear clutch has just engaged, the speed of the rear weights, being on the driven member, remains constant, and the rear clutch remains engaged, while the driving member takes the speed reduction. The driving member, however, being the driven member of the front gear set, carries the weights of the front clutch, and, during its drop in speed caused by rear clutch engagement, causes a corresponding drop in weight force tending to maintain front clutch engagement.

As the engine speed and front clutch speed therefore falls, the capacity of the front clutch to remain engaged falls along the curve $b$, its capacity in ft. lbs. being determinable at any speed to which the engine has fallen by extending a line from that speed to the right to the column headed "Front clutch capacity."

At the same time as the engine speed falls let us assume the torque to have been maintained along the curve $t-8$. If, now, during the fall in engine speed from 2750 R. P. M. to 1100 R. P. M., there is no speed at which the clutch capacity is not greater than the applied torque, the front clutch will not be opened with the closing of the rear clutch as is necessary for third speed, but the shift will be from second speed directly to fourth or high.

To test whether maintenance of the torque along the curve $t-8$, during the drop in engine speed as the rear clutch engages, will pull the front clutch open for third speed or not, an example may be given of a test at a given speed, say 1200 R. P. M. At this speed the capacity of the front clutch is $p=109$ ft. lbs., while the torque available to disengage it is $o=87$ ft. lbs. By further similar tests it may be shown that there is no engine speed in the drop from $h=2700$ R. P. M. to $q=1100$ R. P. M. where the applied torque on curve $t-8$ exceeds the front clutch capacity on curve $b$ and the shift will be from second speed directly to high without going through third.

After the shift to high, the third speed may be pulled back into play by a sudden application of engine torque which exceeds the then existing capacity of the front clutch. Thus at 1600 R. P. M. it may be found that the capacity of the front clutch is 149 ft. lbs. (see right of chart) and that the torque on the curve $t-9$ at 1600 R. P. M. which must be below 149 engine ft. lbs. (see left of column) is in fact only 120 ft. lbs.

From the foregoing it will be seen that after a performance as shown in Fig. 17, that is, after a condition which causes a shift from low to second to high, without going through third speed, the torque may be maintained at a relatively high value as shown by curve $t-9$ without causing a change in ratio from high back to third speed.

Fig. 18 shows that the application of any steady torque without sudden changes may shift through all four speed ratios without stepping over any of them even though the torque applied is not of exceptionally high value. The torque curve $t-10$ represents, throughout its length, approximately half the possible torque for any given speed.

When the engine speed reaches $f=1940$ R. P. M., the front weights will be revolving $g=1293$ R. P. M., and the rear weights $e=345$ R. P. M. Being in low gear, the vehicle speed is 9½ M. P. H. Since the engine torque $f$ now balances the front weight force $g$, a shift from low to second gear takes place, the engine speed being thereby drawn back to $g=1293$ R. P. M., and the front clutch capacity is $s=119$ ft. lbs. which will carry $g$ which represents only 93 ft. lbs. engine torque. Low to second shift was thus made at 9½ M. P. H.

The engine torque being continued without interruption or variation, the engine will rise in speed to that point where the rear weight force on curve $c$ balances the torque on curve $t-10$ when the rear clutch will engage. This occurs when the engine speed reaches $h=2040$ R. P. M. and the rear weights reach $i=816$ R. P. M. which makes 22.7 M. P. H. the shift point from second to third.

Upon engagement of the rear clutch, the engine speed begins to fall and the front clutch capacity drops along the curve $b$. When it reaches $k=91$ ft. lbs. it balances $v=91$ ft. lbs. and the front clutch reopens, allowing the rear clutch to remain closed, which is a requisite for a shift from second to third speed. This is seen to occur at 28.5 M. P. H.

This capacity of the rear clutch, by engagement, of reducing the torque carrying capacity of the front clutch to cause front clutch disengagement, is an important feature of the invention, and is the result of the combination of the two gear sets with gear thrusts, clutch weights and clutch capacities proportioned as indicated.

The rear weights being now at $i=816$ R. P. M. and the drive through the front gear at 1½ to 1, the engine speed will rise to $1½ \times 816 = w = 1224$ R. P. M. when the front clutch releases because the applied torque exceeds its capacity.

By still maintaining the torque constant along the curve $t-10$, and thereby raising the engine speed to $f=1940$ R. P. M., the front weights will be at $g=1293$ R. P. M., and the front gear thrust due to the torque will balance the front weight force and a shift from third to high will take place at 36 M. P. H.

After a shift up from third to high has taken place, the capacity of the front clutch is $s=119$ ft. lbs. Therefore, to maintain high gear after the performance shown in Fig. 18, no torque application above 119 ft. lbs. out of the maximum of 186 ft. lbs. may be applied without returning to third gear, that is, nearly ⅔ of the full engine power may be applied in high gear at 36 M. P. H. without bringing third gear back into play.

Fig. 19 shows what occurs when, from a dead stop, acceleration is brought about by keeping the engine at the maximum torque $t-11$ throughout its range of speeds, under load conditions which permit the vehicle to be accelerated thereby until the engine reaches its maximum H. P. point.

Under such conditions, vehicle acceleration continues in low gear until the engine reaches $f=3600$ R. P. M., the torque now being 160 ft. lbs., and the H. P. 110. The front weights are now rotating $g=2400$ R. P. M. and the rear weights $e=960$ R. P. M. The front gear thrust $f=573$ lbs. now balances the front weight force of 573 lbs. The front clutch therefore engages for second gear at 26.6 M. P. H. and the engine speed is drawn down to 2400 R. P. M. with torque again at $m=186$ ft. lbs.

The capacity of the front clutch, after engagement, is $r=206$ ft. lbs., therefore it will carry the maximum engine torque $m=186$ ft. lbs. and the engine speed again rises to 3600 R. P. M. taking the front weights along at the same speed and raising the rear weights from $e=960$ R. P. M. to $i=1440$ R. P. M., at which point the rear gear thrust due to torque $f$, balances the rear weight force at $i$ and the rear clutch engages at 40 M. P. H. drawing the engine down in speed.

Now as the engine speed falls, the capacity of the front clutch decreases along the curve $b$, and when the engine speed has fallen to $y=2040$ R. P. M., the capacity of the front clutch has been reduced to 186 ft. lbs. which equals the then existing torque $x$ of the engine.

Further reduction in engine speed reopens the front clutch but allows the rear clutch to remain engaged, the condition requisite for third speed ratio. The engine now, instead of further reducing its speed rises, due to the drive being through the front gear, to 1½× the rear weight speed $i$, which is 1½×1440=2160 R. P. M. where the torque is $z$.

If the engine is again allowed to continue with the transmission in third gear ratio, at maximum torque from $z$ to $f$, the front weights will have reached $g=2400$ R. P. M. where the front weight force again balances the front gear thrust and the front clutch again engages for fourth speed or high gear, the vehicle speed being 66.6 M. P. H., drawing the engine speed down to $m=2400$ R. P. M. If the engine speed is again raised to $f=3600$ R. P. M. with the transmission in high the vehicle speed will be 100 M. P. H.

At the shift from third to high at 66.6 M. P. H., the capacity of the front clutch is $r=206$ ft. lbs. and of the rear clutch is $j=325$ ft. lbs. No shift back down may now be made by torque application for the reason that 206 ft. lbs. is beyond the engine.

If, however, the vehicle speed is reduced until the front weights fall in speed as low as $y=186$ ft. lbs. clutch capacity and a vehicle speed of 56.6 M. P. H., the full application of the 186 ft. lbs. engine torque will shift down from high to third gear. In like manner the application of full torque will cause a shift down between the several ratios when a drop in vehicle speed is reached which repreents about 85 percent of the speed at which the shift up took place with full torque applied.

Thus while, with full torque applied, a shift up from first to second took place at 26.6 M. P. H., a shift down from second to first may not be had even by application of full torque unless a reduction in speed to about 22.6 M. P. H. is made. Similarly while with full torque applied, a shift up from second to third ratio took place at 40 M. P. H., a shift down from third to second may not be had even by application of full torque unless the speed has fallen to approximately 34 M. P. H.

Thus it will be seen that the shift in ratio may be from low to high, from low to second to high, or low to second to third to high, all depending on the need.

If a driver doesn't wish to drive faster than 20 M. P. H. but wishes to attain that speed as quickly as possible, he operates as illustrated in Fig. 16. Or, if he doesn't desire to travel over 30 M. P. H. he may operate as illustrated as in Fig. 17. If he applies a moderate torque and maintains it at a steady value he may, without knowing it, have shifted through all four ratios when vehicle acceleration has proceeded until a speed of 36 M. P. H. is attained, or he may apply and maintain maximum torque and the mechanism will automatically, without his knowledge or consent shift to a next higher ratio and reduce the engine speed each time it reaches its peak H. P. point.

A gear set similar to the front gear set employed herein is shown and described in my co-pending application Serial No. 257,052, filed February 18, 1939, but is necessarily shown herein in combination with a rear gear set of different design because of the interaction of one with the other.

I claim:

1. In a transmission mechanism, an engine, two tandem planetary speed reducing gear sets each set comprising a ring gear, a sun gear, planet pinions in mesh with both gears and a planet pinion carrier, the carrier of the first set and the sun gear of the second set being permanently connected for rotation in unison, a clutch for connecting the engine and ring gear of the first set for rotation in unison, a second clutch for connecting the engine and sun gear of the second set for rotation in unison, a third clutch for connecting the sun gear and carrier of the second set together for rotation in unison, and brake means for holding the sun gear of the first set and the ring gear of the second set nonrotative.

2. Power transmission mechanism comprising, an engine, two shafts, two planetary speed reducing gear sets each comprising a sun gear, a concentric gear, planet pinions in mesh with both gears, and a carrier for the planet pinions, the carrier of the first set and the sun gear of the second set being both secured to the first shaft, a clutch for connecting the engine and ring gear of the first set for rotation in unison, a second clutch for connecting the engine and first shaft, a third clutch for connecting the two shafts for rotation in unison and brake means for holding the sun gear of the first set and the ring gear of the second set nonrotative.

3. In a transmission mechanism, two speed reducing gear sets connected in series each having a driving and a driven member, a clutch for connecting said members directly, gearing for connecting said members when the clutch is not engaged, a speed responsive device for varying the power transmitting capacity of the clutch and a torque responsive device urging the clutch to disengaged position in proportion to the power being transmitted, the second gear set having larger speed reducing capacity than the first and the clutch of the second set having larger power transmitting capacity for the same speed than the clutch of the first set, whereby a given torque load may allow the second clutch to remain engaged and cause the first clutch to open.

4. The combination with an engine, of two axially aligned shafts, two planetary gear sets carried on said shafts, each set comprising a sun gear, a ring gear, planet pinions connecting said gears and a carrier for said pinions, the first shaft having the carrier of the first set and the sun gear of the second set permanently secured thereto, the second shaft having the carrier of the second set permanently secured thereto, a clutch for connecting the ring gear of the first set directly to the engine, a second clutch for connecting the first shaft directly to the engine, a third clutch for connecting the two shafts for rotation in unison, and brakes for holding the sun gear of the first set and the ring gear of the second set nonrotative.

5. The combination with an engine, of two axially aligned shafts, two planetary gear sets carried on said shafts, each set comprising a sun gear, a ring gear, planet pinions connecting said gears, and a carrier for said pinions, the first shaft having the carrier of the first set and the sun gear of the second set permanently secured thereto, the second shaft having the carrier of the second set permanently secured thereto, a clutch responsive to the speed of the engine for connecting the ring gear of the first set directly to the engine, a second clutch responsive to the speed of the first shaft for connecting said first shaft directly to the engine, a third clutch responsive to the speed of the second shaft for connecting the first and second shafts together directly, and brake means for holding the sun gear of the first set and the ring gear of the second set nonrotative.

6. The combination with an engine, of two axially aligned shafts, two planetary gear sets carried on said shafts, each set comprising a sun gear, a ring gear, planet pinions connecting said gears, and a carrier for said pinions, the first shaft having the carrier of the fist set and the sun gear of the second set permanently secured thereto, the second shaft having the carrier of the second set permanently secured thereto, a clutch responsive to the speed of the engine for connecting the ring gear of the first set directly to the engine, a second clutch responsive to the speed of the first shaft for connecting said first shaft directly to the engine, a third clutch responsive to the speed of the second shaft for connecting the first and second shafts together directly, brake means for holding the sun gear of the first set and the ring gear of the second set nonrotative, and torque means operated by the ring gears of the first and second gear sets to respectively oppose engagement of the second and third clutches.

7. The combination of an engine with transmission gearing comprising, two speed reducing gear sets in axial alignment, each set having an input and an output member, the output member of the first set being the input member of the second set, each set having a sun gear, a ring gear concentric therewith, planet pinions in mesh with both gears, and a carrier for the planet pinions, the ring gear of the first set being on its input member, the sun gear being its reaction member, and the carrier on its output member, the sun gear of the second set being on its input member, the ring gear being its reaction member, and the carrier on its output member, means for connecting the input member of the first set directly to the engine, means for connecting the input member of the second set directly to the engine, means for connecting the output members of the first and second sets directly to each other, and means to hold the reaction members nonrotative.

8. Power transmission mechanism comprising, one gear set having a sun gear, a ring gear, planet pinions in mesh with both gears, a planet pinion carrier, said carrier being permanently connected to the output member of the set, a clutch for connecting the sun gear to the carrier for rotation in unison, a brake for holding the ring gear nonrotative, another clutch for connecting the sun gear to the engine for rotation in unison, a speed responsive means for engaging the second mentioned clutch permanently secured for rotation in unison with the sun gear, whereby reduction in sun gear speed caused by engagement of the first mentioned clutch reduces the speed of the speed responsive means to lessen its engaging force, an additional gear set, and an engine clutch for connecting the engine through the additional gear set when the second mentioned clutch becomes disengaged.

9. Power transmission mechanism comprising an engine, a gear set having a sun gear, a ring gear, planet pinions in mesh with both gears, and a planet pinion carrier, said carrier being permanently connected to the output member of the set, a clutch for connecting the sun gear to the carrier for rotation in unison, a brake for holding the ring gear nonrotative, a second clutch for connecting the sun gear to the engine for rotation in unison, a speed responsive means for engaging said second clutch permanently secured for rotation in unison with the sun gear, whereby reduction in sun gear speed caused by engagement of the first said clutch reduces the speed of the speed responsive means to permit disengagement of the second said clutch, and a third clutch for connecting the engine to the sun gear through other means when the second clutch disengages.

10. Planetary transmission mechanism comprising, an engine, a gear set, a second gear set comprising, a sun gear, a ring gear, planet pinions in mesh with both gears, and a planet pinion carrier, said carrier being the output member of the said second set, a clutch for connecting the sun gear to the engine through the first gear set, a clutch for connecting the sun gear to the engine directly, a clutch for connecting the sun gear to the said carrier directly, and a brake for holding the ring gear nonrotative.

11. In a planetary transmission mechanism, a driving member, a driven member, a sun gear on the driving member, a ring gear as the reaction member, a planet pinion carrier on the driven member, planet pinions on the carrier in mesh with both gears, a clutch engageable for connecting the driving member to the carrier independently of the gearing, speed responsive means for moving a clutch engaging member to effect clutch engagement, means for holding said ring gear against rotation, and means whereby the reaction on said ring gear moves the clutch engaging member to oppose said speed responsive means engaging said clutch.

12. In a planetary transmission mechanism, a driving member, a driven member, a sun gear on the driving member, a ring gear as the reaction member, a planet pinion carrier on the driven member, planet pinions on said carrier in mesh with both gears, a clutch for connecting the driving member and carrier directly, speed responsive means for engaging the clutch, means for holding the ring gear nonrotative, and means whereby the reaction of said ring gear moves it axially to hold said clutch in disengaged position.

13. In a planetary transmission mechanism, a driving member, a driven member, a sun gear on the driving member, a ring gear as the reaction member, a planet pinion carrier on the driven member, planet pinions on said carrier in mesh with both gears, a clutch for connecting the driving member and carrier directly, speed responsive means for engaging the clutch, means for holding the ring gear nonrotative, torque means for moving said ring gear axially while so held to enforce clutch disengagement, and antifriction means to allow said ring gear to move axially while held nonrotative.

14. Transmission mechanism comprising, two planetary speed reducing gear sets in series, both having input and output members and a clutch for connecting said members directly, the output member of the first set being the input member of the second set, each set comprising a ring gear, a sun gear, planet pinions in mesh with said gears and a planet pinion carrier, the first set having the ring gear on the input member and the sun gear as the reaction member, the second set having the sun gear on the input member and the ring gear as the reaction member, both sets having their carriers on their output members, a speed responsive means rotatable in unison with the output member of the second set for engaging its clutch and thereby reducing its input member speed, and a second speed responsive means rotatable in unison with the said input member of the second set, operative upon said reduction to disengage the clutch of the first gear set, whereby, when the clutch of the second set engages, it disengages the clutch of the first set.

15. Automotive transmission mechanism comprising, two gear sets normally connected in series, both having input and output members and each having a clutch for connecting said members directly, the output member of the first set being the input member of the second set, the second set having greater speed reducing capacity than the first, a speed responsive means rotatable in unison with the output member of the second set for engaging the clutch of the second set and thereby reducing the speed of the input member of the second set, and a second speed responsive means rotatable in unison with the said input member of the said second set operative by the said reduction in input member speed to disengage the clutch of the first set when the clutch of the second set engages.

16. Power transmission mechanism comprising, one gear set having a sun gear, a ring gear, planet pinions in mesh with both gears, a planet pinion carrier, said carrier being permanently connected to the output member of the set, a clutch for connecting the sun gear to the carrier for rotation in unison, a brake for holding the ring gear nonrotative, another clutch for connecting the sun gear to the engine for rotation in unison, a speed responsive means for engaging the second mentioned clutch permanently secured for rotation in unison with the sun gear, whereby reduction in sun gear speed caused by engagement of the first mentioned clutch reduces the speed of the speed responsive means to lessen its engaging force, an additional gear set, an engine clutch for connecting the engine thru the additional gear set when the second mentioned clutch becomes disengaged, and a torque means operated by load transmitted thru said additional gear set to hold said second mentioned clutch disengaged as long as the force of the torque carried thru the additional gear set exceeds the force of the said speed responsive means.

17. The combination with an engine, of transmission mechanism comprising, two speed reducing gear sets, the first having its driving member connectible to the engine, the driven member of the first set being the driving member of the second set, the second set having approximately one and two thirds the speed reducing capacity of the first, clutch parts on each set for connecting its driving and driven members in one to one driving relation, torque operative means on each set for opposing engagement of its clutch parts in direct proportion to the torque being transmitted, and a speed responsive device on each set for engaging its clutch parts proportioned to overcome its torque responsive means and effect clutch engagement when the engine speed is at the maximum horse power point, the torque the maximum for that point, and its speed responsive device is rotating at $$\frac{\text{engine speed}}{\text{ratio of set}}$$

whereby the clutch parts of the second set may never engage except when the clutch parts of the first set is first engaged, yet engagement of the clutch parts of the second set may force disengagement of the clutch parts of the first set.

18. The combination with an engine, of two axially aligned shafts, two planetary gear sets carried on said shafts, each set comprising a sun gear, a ring gear, a planet pinion in mesh with both the ring gear and the sun gear, and a carrier for said pinion, the first shaft having the carrier of the first set and the sun gear of the second set permanently secured thereto, the second shaft having the carrier of the second set permanently secured thereto, a speed controlled clutch for connecting the ring gear of the first set directly to the engine or disconnecting it therefrom, a speed-torque controlled clutch for connecting the first shaft directly to the engine, a speed torque controlled clutch for connecting the two shafts for rotation in unison, and brakes for holding the sun gear of the first set and the ring gear of the second set nonrotative.

19. The combination with an engine, of two axially aligned shafts, two planetary gear sets carried on said shafts, each set comprising a sun gear, a ring gear, planet pinions connecting said gears and a carrier for said pinions, the first shaft having the carrier of the first set and the sun gear of the second set permanently secured thereto, the second shaft having the carrier of the second set permanently secured thereto, a friction clutch for connecting the ring gear of the first set directly to the engine, a friction clutch for connecting the first shaft directly to the engine, a friction clutch for connecting the two shafts for rotation in unison, and two brakes for respectively holding the sun gear of the first set and the ring gear of the second set nonrotative.

20. The combination with an engine, of two axially aligned shafts, two planetary gear sets on said shafts, each set comprising a sun gear, a ring gear, a planet pinion in mesh with both the sun gear and the ring gear and a carrier for said pinion, the first shaft having the carrier of the first set and the sun gear of the second set permanently secured thereto for unitary rotation therewith, the second shaft having the carrier of the second set permanently secured thereto for unitary rotation therewith, a friction clutch responsive to engine speed for connecting the ring gear of the first set directly to the engine or disconnecting it therefrom, a friction clutch responsive to the speed of the first shaft and the torque carried by the ring gear of the first set for connecting the first shaft directly to the engine or disconnecting it therefrom, a friction clutch responsive to the speed of the second shaft and the torque carried by the ring gear of the second set for connecting the first and second shafts for unitary rotation or disconnecting them from each other, brake means for holding the sun gear of the first set nonrotative, and brake means for holding the ring gear of the second set nonrotative.

FREDERICK W. COTTERMAN.